(12) United States Patent
Oubre, Jr.

(10) Patent No.: US 11,419,269 B2
(45) Date of Patent: Aug. 23, 2022

(54) METHOD AND APPARATUS FOR HANDLING AND DISPOSAL OF ORGANIC WASTE MATERIALS

(71) Applicant: Allen ("Buddy") Oubre, Jr., St. Martinville, LA (US)

(72) Inventor: Allen ("Buddy") Oubre, Jr., St. Martinville, LA (US)

(*) Notice: Subject to any disclaimer, the term of this patent is extended or adjusted under 35 U.S.C. 154(b) by 293 days.

(21) Appl. No.: 16/782,757

(22) Filed: Feb. 5, 2020

(65) Prior Publication Data

US 2020/0245558 A1 Aug. 6, 2020

Related U.S. Application Data

(60) Provisional application No. 62/801,752, filed on Feb. 6, 2019.

(51) Int. Cl.

| | |
|---|---|
| *A01D 45/10* | (2006.01) |
| *A01D 43/08* | (2006.01) |
| *A01F 12/44* | (2006.01) |
| *A01D 41/127* | (2006.01) |
| *B07B 7/083* | (2006.01) |
| *B07B 4/02* | (2006.01) |
| *B07B 7/10* | (2006.01) |

(52) U.S. Cl.
CPC ............ *A01D 45/10* (2013.01); *A01D 43/08* (2013.01); *A01D 41/1276* (2013.01); *A01F 12/444* (2013.01); *B07B 4/025* (2013.01); *B07B 7/083* (2013.01); *B07B 7/10* (2013.01)

(58) Field of Classification Search
CPC .... A01D 45/10; A01D 43/08; A01D 41/1276; A01D 12/444; B07B 4/025; B07B 7/083; B07B 7/10
See application file for complete search history.

(56) References Cited

U.S. PATENT DOCUMENTS

| | | | | |
|---|---|---|---|---|
| 720,697 A | * | 2/1903 | Jensen | A01D 45/10 406/104 |
| 877,320 A | * | 1/1908 | Gardiner | A01D 45/10 406/104 |
| 3,788,048 A | * | 1/1974 | Stiff | B01D 45/14 55/406 |

(Continued)

*Primary Examiner* — Arpad Fabian-Kovacs
(74) *Attorney, Agent, or Firm* — Ted M. Anthony (57) ABSTRACT

A head assembly having ancillary fan assemblies can be operationally mounted to the outlet of a conventional harvester extractor. The ancillary fan assemblies can generally direct suspended trash materials in a substantially upward and laterally outboard direction toward both lateral sides of a harvester. A duct assembly having an inlet and an outlet generally extends from each ancillary fan assembly to a position generally above a track of a harvester. Trash material expelled by a harvester extractor enters the head assembly and is directed by the ancillary fan assemblies into each of the duct assemblies, through said duct assemblies, and onto the upper surfaces of the tracks of the harvester. The trash material is then conveyed by the tracks toward the front or forward portion of the harvester, where it falls off of the tracks generally in the path of the harvester. As the harvester continues moving forward, the harvester runs over the deposited organic trash material, plowing the organic trash material into the underlying terrain.

14 Claims, 7 Drawing Sheets

(56) References Cited

U.S. PATENT DOCUMENTS

| | | | | |
|---|---|---|---|---|
| 3,791,114 | A * | 2/1974 | Fowler | A01D 45/10 56/13.9 |
| 3,828,536 | A * | 8/1974 | Fowler | A01D 45/10 56/502 |
| 3,863,431 | A * | 2/1975 | Fowler | A01D 45/10 56/502 |
| 3,925,199 | A * | 12/1975 | Quick | A01D 45/10 209/3 |
| 3,946,875 | A * | 3/1976 | Fowler | A01D 45/10 209/639 |
| 4,924,662 | A * | 5/1990 | Quick | A01D 45/10 56/12.8 |
| 5,816,036 | A * | 10/1998 | Caillouet | A01D 45/10 56/63 |
| 6,500,062 | B1 * | 12/2002 | Harris | B07B 4/02 460/79 |
| 9,119,346 | B2 * | 9/2015 | Vergote | A01D 45/10 |
| 9,456,547 | B2 * | 10/2016 | Cazenave | A01D 45/10 |
| 9,763,386 | B2 * | 9/2017 | Holly | A01D 45/10 |
| 9,826,685 | B2 * | 11/2017 | Mello | A01D 45/10 |
| 9,976,567 | B2 * | 5/2018 | Junior | F04D 29/384 |
| 10,091,934 | B2 * | 10/2018 | Dugas | A01F 12/48 |
| 10,194,589 | B2 * | 2/2019 | Almeida | A01D 43/08 |
| 10,485,170 | B2 * | 11/2019 | Nicora | B07B 4/02 |
| 2010/0132326 | A1 * | 6/2010 | Berthet | A23N 15/02 56/328.1 |
| 2015/0201553 | A1 * | 7/2015 | Kalverkamp | A01D 33/04 209/472 |

\* cited by examiner

METHOD AND APPARATUS FOR HANDLING AND DISPOSAL OF ORGANIC WASTE MATERIALS

CROSS REFERENCES TO RELATED APPLICATIONS

THIS APPLICATION CLAIMS PRIORITY OF U.S. PROVISIONAL PATENT APPLICATION Ser. No. 62/801,752, FILED Feb. 6, 2019, WHICH IS INCORPORATED HEREIN BY REFERENCE.

STATEMENTS AS TO THE RIGHTS TO THE INVENTION MADE UNDER FEDERALLY SPONSORED RESEARCH AND DEVELOPMENT

NONE

BACKGROUND OF THE INVENTION

1. Field of the Invention

This disclosure pertains to a method and apparatus for handling and disposal of organic trash and waste material generated during an agricultural harvesting process. More particularly, the present invention pertains to a method and apparatus for redirecting organic trash and waste material generated during an agricultural harvesting process, and at least partially plowing said organic trash and waste material into the underlying soil or terrain.

Background of the Invention

Sugarcane harvesters are agricultural devices used to harvest and partially process sugarcane. Such harvesters, which are similar in function and design to conventional combine harvesters, cut sugarcane stalks at their base, send said stocks to a "chopper box" that chops the cane stalks into relatively small segments (sometimes referred to as "billets") and strips leaves and other vegetation from the cane stalks.

Typically, such billets or cane segments are directed through an elevator assembly and discharged laterally or toward the rear of the harvester device. Such cane segments are frequently discharged from the elevator assembly into a storage/collection bin attached to the harvester, or into a storage/collection bin mounted on a separate vehicle traveling alongside or behind said cane harvester. The cane segments or billets that are collected are then transported to a mill, processing facility or other location for ultimate disposition.

At least one extractor apparatus is used to separate leafy or other organic material (including, without limitation, stripped leaves, sprouts and other vegetation) from chopped billets (such separated materials are sometimes referred to herein as "trash materials"). Although designs can vary, such extractors generally comprise large powered fans that rotate in a plane that is oriented substantially parallel to the surface of the underlying terrain. The extractor fan forces said separated trash materials out of an exit vent which is typically pointed generally behind and lateral to the harvester.

Conventional extractors discharge said trash materials in a broad dispersal pattern over a large area with little or no control or direction over where said trash materials eventually come to rest. Consequently, such conventional extractors frequently discharge such trash materials in undesirable locations such as, for example, on adjacent property, on roadways, and/or in waterways. Frequently, said conventional extractors discharge the organic trash materials on top of planted rows; such deposited trash materials can block sunlight from reaching the crops and trap moisture, further hindering future agricultural crop productivity.

Even when said trash materials discharged from an extractor are contained entirely on a tract that is being harvested, such trash materials are typically deposited in a substantially uniform blanket-like layer that rests on—and substantially covers—the upper surface of the harvested terrain. In this configuration, the deposited materials will resist decay and decomposition; the deposited materials will remain substantially intact for a relatively extended period of time, thereby obstructing or hindering further agricultural or other beneficial use of the property and growth/productivity of future crops.

Historically, such deposited trash materials were burned. However, burning operations suffer from numerous disadvantages including, without limitation, pollution or other negative environmental impact, additional costs and safety concerns. Alternatively, such deposited trash materials can be collected and transported to another location for disposal, plowed into the ground, or swept off the top of planted rows; all scenarios require at least one additional operation to be performed which, in turn, equates to additional manpower needs, greater expense and more safety risks.

Thus, there is a need for a means for disposing of trash material generated during agricultural harvesting (including, without limitation, sugarcane harvesting). Such disposal means should be efficient and cost effective, while facilitating continued agricultural uses of property.

SUMMARY OF THE PRESENT INVENTION

While the present invention will be described with reference to preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

In a preferred embodiment, the present invention comprises a head assembly that can be operationally mounted to the outlet of a conventional harvester extractor, such as a sugarcane harvester. Said head assembly generally comprises at least one, but typically two, ancillary powered fan assemblies. Although other power sources can be employed without departing from the scope of the present invention, in a preferred embodiment the same hydraulic system utilized to power an extractor fan an also be used to power the ancillary fan assemblies.

The orientation of said fan assemblies can be adjusted to fit particular harvester/mounting configurations. Said ancillary fan assemblies can generally direct suspended trash materials (that would otherwise be expelled from an extractor outlet) in generally upward and laterally outboard directions—that is, toward both lateral sides of a harvester. Thus, in a preferred embodiment, said ancillary fans comprise tandem powered fan assemblies having outlets that are oriented in different directions.

Said ancillary fan assemblies can rotate in a clockwise direction, counterclockwise direction, or combination thereof. In a preferred embodiment, one fan of a tandem fan assembly rotates in a clockwise direction, while the other fan of said tandem fan assembly rotates in a counterclockwise direction.

A duct assembly having an inlet and an outlet generally extends from each ancillary fan assembly to a position generally above a track of a harvester. In a preferred embodiment, the inlet of a first duct assembly is operationally attached to the outlet of a first ancillary fan assembly, while the outlet of said first duct assembly extends to a position above a first track of said harvester on a first side of said harvester. Similarly, the inlet of a second duct assembly is operationally attached to the outlet of a second ancillary fan assembly, while the outlet of said second duct assembly extends to a position above a second track of said harvester on a second side of said harvester. Said duct assemblies can comprise substantially enclosed conduits, or they can be vented or have mesh areas. Additionally, optional flaps or guides can direct the organic trash material directly onto a track, thereby preventing it from falling to either side of said track.

Trash material expelled by a harvester extractor enters said head assembly and is directed by the ancillary fan assemblies into said duct assemblies. In a preferred embodiment, the total volume of said trash material can be substantially evenly distributed between a first fan assembly and corresponding first duct assembly, and a second fan assembly and corresponding second duct assembly; however, it is to be observed that different proportions of the total output can be split or divided between said first and second duct assemblies as desired.

Trash material is blown or otherwise forced by said tandem fan assemblies through said duct assemblies. Such trash material is subsequently discharged from outlets of said duct assemblies onto the upper surfaces of the tracks of the harvesters. Such trash material is then conveyed by said tracks toward the front or forward portion of the harvester, where it falls off of said tracks generally in the path of said harvester. As the harvester continues moving forward, the harvester runs over the deposited organic trash material; the weight of the harvester, cooperating with the design of the tracks, works to grind or abrade said trash material while simultaneously plowing said organic trash material into the underlying terrain.

In this manner, the trash material is substantially confined or limited to the furrows in the terrain created by the harvester tracks. Further, such plowed organic trash material degrades and decomposes at a much faster rate than trash material that is deposited in a blanket-like layer. Such degraded/decomposed trash material can provide nutrients to the soil, thereby beneficially impacting future agricultural crops. The present invention facilitates efficient and cost effective handling and disposal of trash vegetation material generated during the harvesting process, eliminating the need for burning of such trash material or supplemental/secondary operations required to collect, transport and/or dispose of the trash material.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
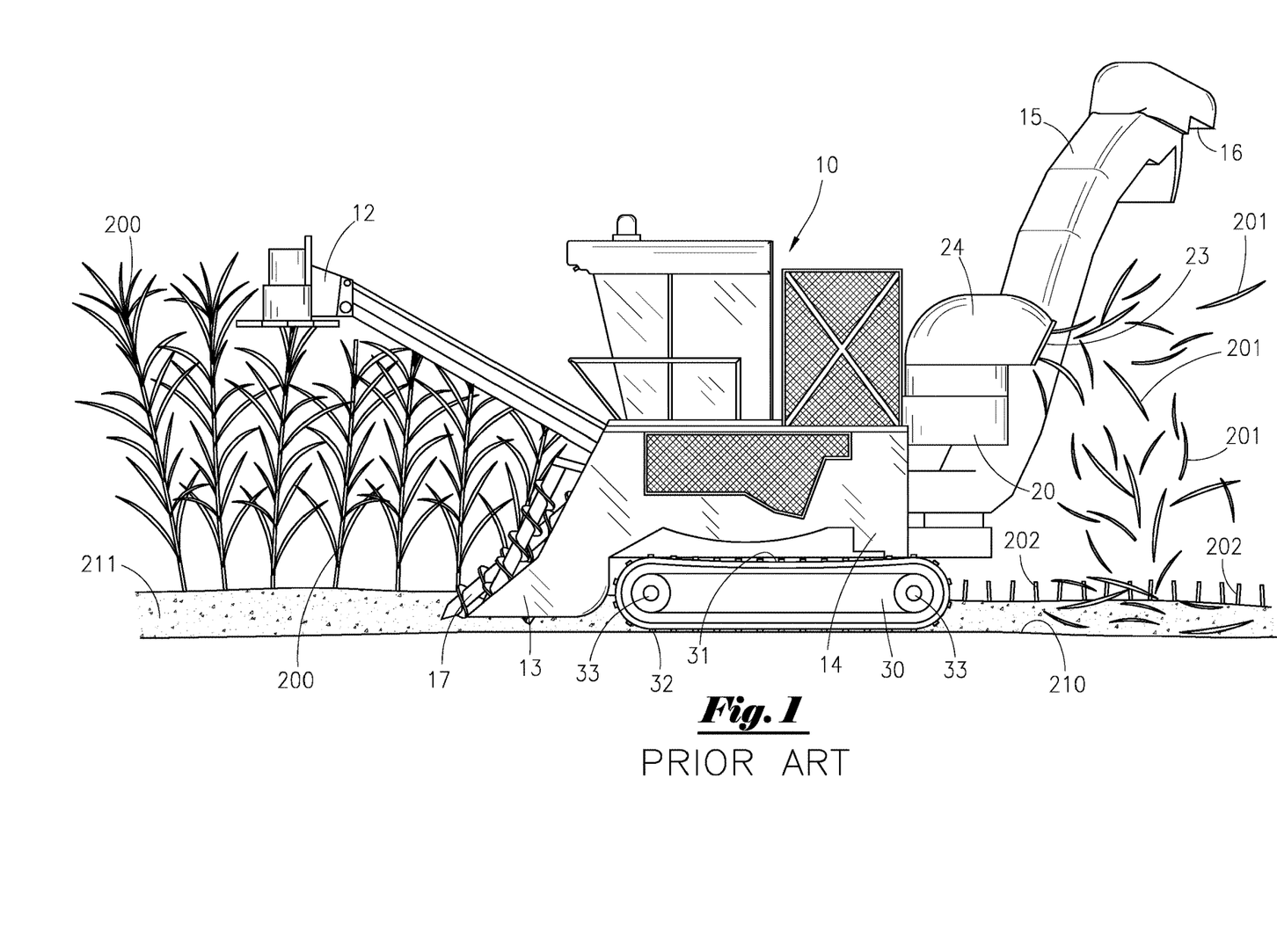
FIG. 1 depicts a side view of a conventional sugarcane harvester engaged in cane harvesting operations.

FIG. 1 depicts a side view of a conventional sugarcane harvester 10 engaged in cane harvesting operations. Sugarcane harvester 10 rides on ground 210 and is used to harvest growing sugarcane crop 200; in the configuration depicted in FIG. 1, sugarcane harvester 10 is a conventional sugarcane combine harvester that is well known to those having skill in the art. Although the specific configuration of said conventional sugarcane harvester 10 can vary, in the embodiment depicted in FIG. 1 said harvester 10 has cab or control station 11 where an operator can ride to control operation of said harvester 10.

Track assembly 30 is used to propel harvester 10 along underlying ground 210. Although other embodiments can be envisioned without departing from the scope of the present invention, track assembly 30 comprises a continuous or "caterpillar" track system. Said track assembly 30 generally comprises a continuous flexible band or loop of treads or track plates driven by two or more wheels 33. Said substantially continuous and flexible loop defines generally downwardly facing lower surface 32 (contacting ground 210), and upwardly facing upper surface 31. In the embodiment depicted in FIG. 1, sugarcane crop 200 is planted in substantially linear rows in raised berm-like soil 211; it is to be observed that conventional sugarcane harvester 10 can frequently ride on ground 210 substantially between said parallel planted rows 211.

In the embodiment depicted in FIG. 1, sugarcane harvester 10 has crop topper for 12 for removing unproductive leaves or other organic matter from the upper portion of sugarcane crop 200. Crop divider 13, having augers 17, cuts the stalks of sugarcane crop 200 at or near their bases. The cut cane stalks are sent to chopper 14—sometimes referred to as a "chopper box"—that chops said stalks of sugarcane crop 200 into relatively small segments (sometimes referred to as "billets") and strips leaves and other vegetation from the cane stalks. As depicted in FIG. 1, cut cane stalk stumps 202 can remain in the ground behind harvester 10 after said harvester 10 has passed.

Said billets or cane segments (not depicted in FIG. 1) are typically directed through elevator 15 and discharged laterally through elevator outlet 16 (sometimes referred to as a secondary extractor) in a manner well known to those having skill in the art. Said discharged billets or cane segments are frequently expelled from elevator 15 through outlet 16 into a storage/collection bin (typically a wagon or trailer) pulled by harvester 10, or a storage/collection bin mounted on a separate vehicle traveling alongside said harvester 15. Collected cane segments or billets can be transported to a mill, processing facility or other location for ultimate use or disposition.

Still referring to FIG. 1, harvester 10 has primary extractor assembly 20 that is used to separate leafy trash material 201 (including, without limitation, stripped leaves, sprouts and other vegetation from cut sugarcane crop 200) from chopped billets or cane segments. Primary extractor 20 comprises a housing 24 disposed over or in proximity to at least one large powered fan (not visible in FIG. 1) that rotates in a plane that is oriented substantially parallel to the surface of the underlying ground 210. Separated trash materials 201 and/or other debris are directed out of exit outlet 23; as depicted in FIG. 1, said outlet 23 is typically pointed generally behind the direction of travel of harvester 10.

In the embodiment depicted in FIG. 1, trash materials 201 or other debris discharged from extractor 20 of conventional harvester 10 are typically deposited in a substantially uniform blanket-like layer that rests on—and substantially covers—the upper surface of ground 210. In this configuration, the deposited trash materials 201 will resist decay and decomposition; the deposited materials will remain substantially intact for a relatively extended period of time, thereby obstructing or hindering further agricultural or other beneficial use of the property and growth/productivity of future crops. Although the deposited trash materials 201 can be burned, such burning operations suffer from numerous disadvantages including, without limitation, pollution or other negative environmental impact, additional costs and safety concerns.

Figure 2:
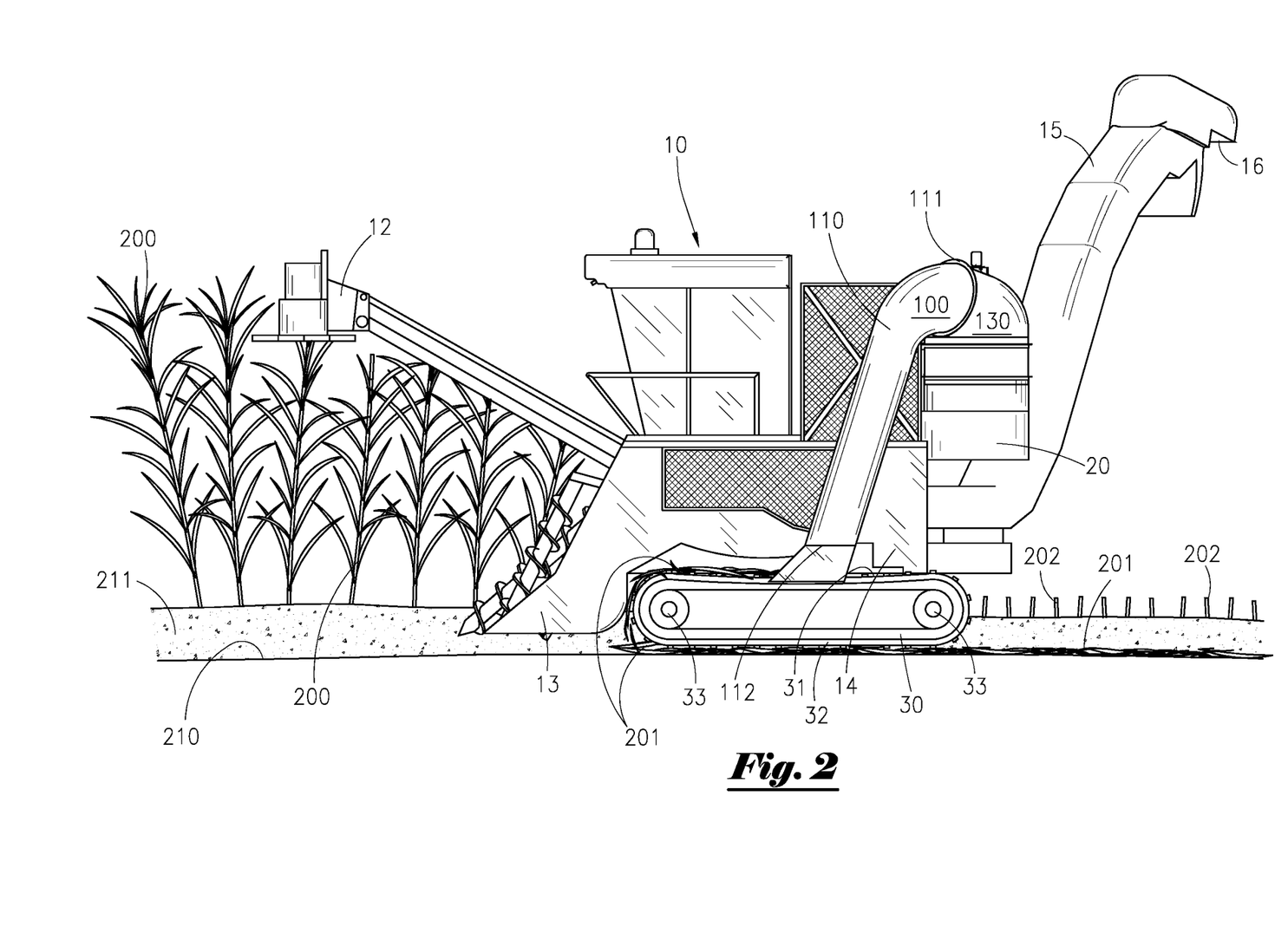
FIG. 2 depicts a side view of the waste handing assembly of the present invention installed on a conventional sugarcane harvester engaged in cane harvesting operations.
Figure 3:
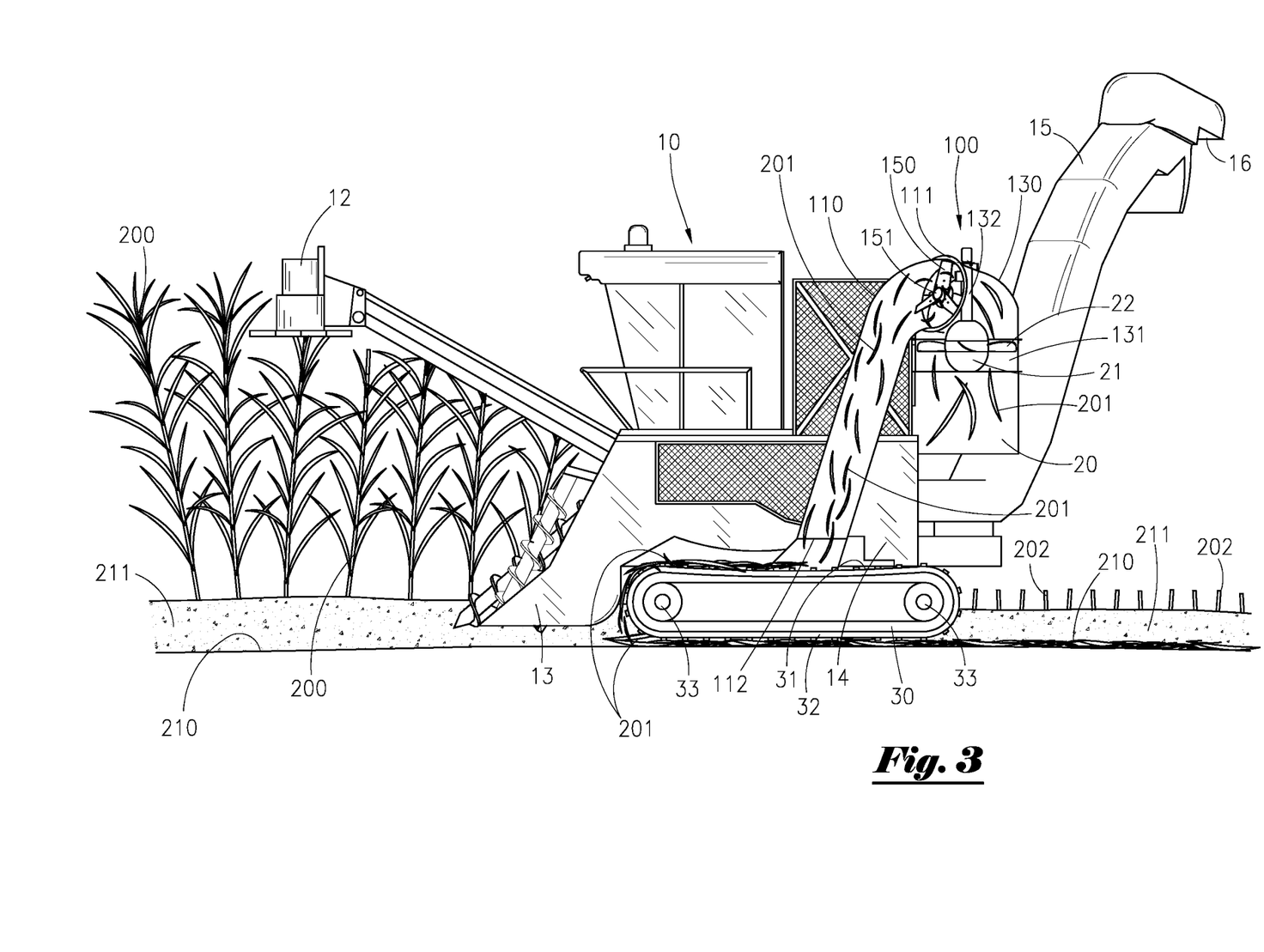
FIG. 3 depicts a partial cut-away side view of the waste handing assembly of the present invention installed on a conventional combine engaged in cane harvesting operations.

FIG. 2 depicts a side view of the waste handing assembly 100 of the present invention installed on a conventional sugarcane harvester 10 engaged in cane harvesting operations, while FIG. 3 depicts a partial cut-away side view of said waste handing assembly depicted in FIG. 2. As depicted in FIGS. 2 and 3, tracks 30 of sugarcane harvester 10 traverse along ground 210, while crop topper 12 removes unproductive leaves or other organic matter from the upper portion of sugarcane crop 200 and crop divider 13 cuts sugarcane crop 200 at or near ground 210. Cut cane stalks of sugarcane crop 200 are sent to chopper 14 that chops said stalks of sugarcane crop 200 into relatively small billets and strips leaves and other vegetation from the cane stalks. Cut cane stalk stumps 202 may remain in the ground behind harvester 10 after said harvester 10 has passed.

Tracks 30 of sugarcane harvester 10 traverse along ground 210, while crop topper 12 removes unproductive leaves or other organic matter from the upper portion of sugarcane crop 200 and crop divider 13 cuts sugarcane crop 200 at or near ground 210. Cut cane stalks of sugarcane crop 200 are sent to chopper 14 that chops said stalks of sugarcane crop 200 into relatively small billets and strips leaves and other vegetation from the cane stalks. Cut cane stalk stumps 202 can remain in the ground behind harvester 10 after said harvester 10 has passed.

Still referring to FIGS. 2 and 3, primary extractor assembly 20 is used to separate leafy trash material 201 (including, without limitation, stripped leaves, sprouts and other vegetation separated from cut sugarcane crop 200) from chopped billets or useable cane segments exiting chopper 14. However, an extractor housing (such as extractor housing 24 depicted in FIG. 1) is not installed on cane harvester 10, and is replaced by fan distribution assembly 130 mounted on base 131. First duct member 110 having first end 111 (serving as an inlet to said first duct member 110) and a second end 112 (serving as an outlet to said first duct member 110) extends from fan distribution assembly 130 along a lateral side of sugarcane harvester 10.

Referring to FIG. 3, primary extractor 20 comprises at least one large powered fan 21 having a plurality of fan blades 22 rotatably mounted on fan shaft 132. As depicted in FIG. 3, fan shaft 132 is mounted in fan distribution assembly 130 and is oriented in substantially perpendicular orientation to the upper surface of ground 210; plurality of fan blades 22 rotate in a plane that is oriented substantially parallel to said upper surface of underlying ground 210.

Separated trash materials 201 exiting chopper 14 are further chopped by powered extractor fan 21, and are directed into an internal chamber defined by fan distribution assembly 130. First ancillary fan 150 having a plurality of fan blades 151 is mounted within said fan distribution assembly 130. Separated trash materials 201 directed into the internal chamber of fan distribution assembly 130 are further chopped by said first ancillary fan 150 and thereafter directed into first duct 110 through an inlet at first end 111. Said separated trash materials 201 pass through first duct 110 and exit said first duct 110 through an outlet at second end 112.

Trash material 201 discharged from outlets at second end 112 of first duct assembly 110 is deposited onto the upper surface 31 of the track member 30. Such trash material 201 is then conveyed by said track member 30 toward the front or forward portion of harvester 10, where it falls off of said track member generally in the path of said harvester 10. As the harvester 10 continues moving forward, harvester 10 runs over the deposited organic trash material 201; the weight of harvester 10, cooperating with the configuration of track member 30, works to grind or abrade said trash material 201 while simultaneously plowing said organic trash material 201 into the underlying ground 210.

Figure 4:
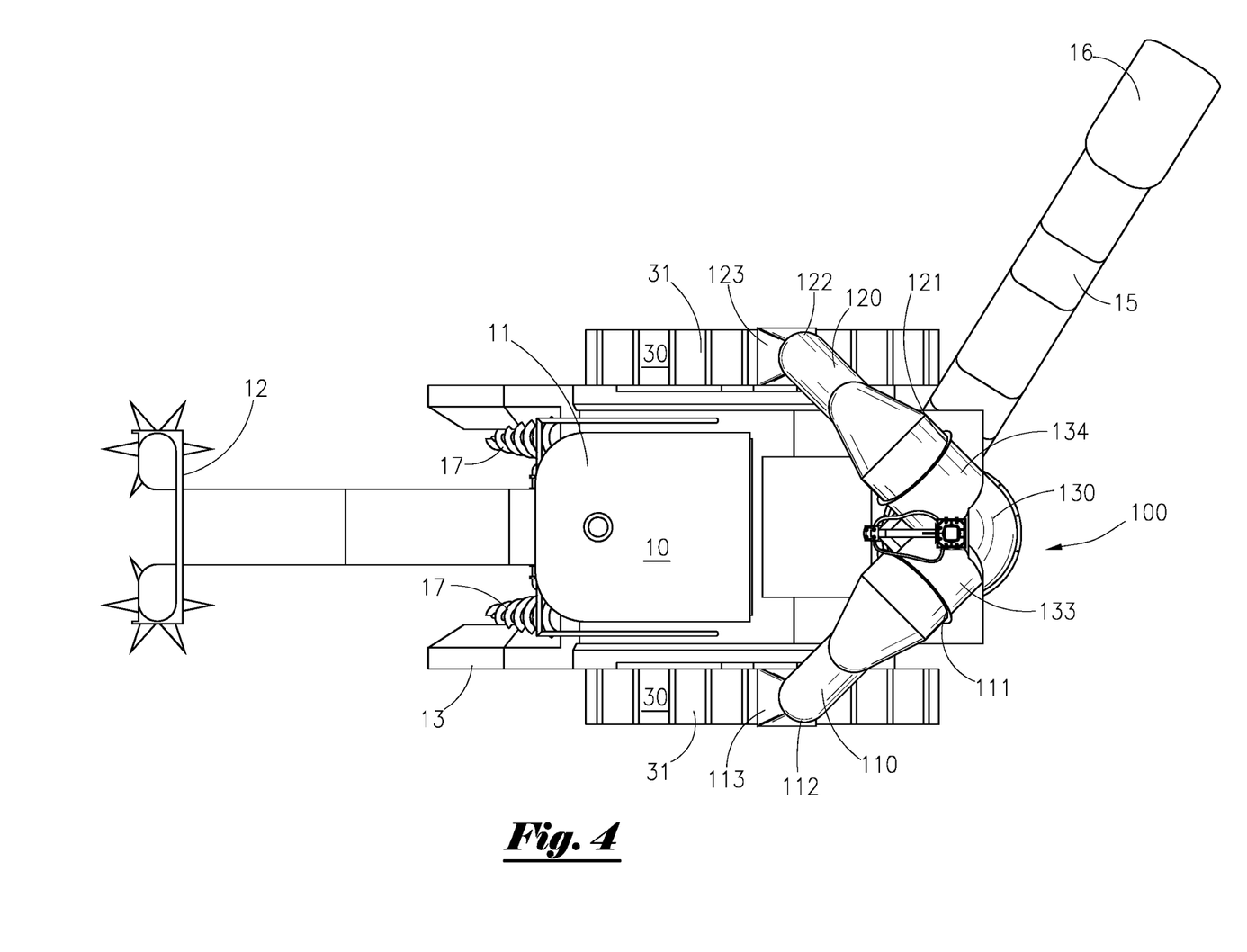
FIG. 4 depicts an overhead view of the waste handing assembly of the present invention installed on a conventional combine.

FIG. 4 depicts an overhead view of the waste handing assembly 100 of the present invention installed on a conventional combine sugarcane harvester 10. Although the specific configuration of said conventional sugarcane harvester 10 can vary, said harvester 10 has cab or control station 11 where an operator can ride to control operation of said harvester 10. Track assemblies 30 are used to propel harvester 10 along an underlying support base (such as, for example, ground 210 depicted in FIGS. 1 through 3).

In the embodiment depicted in FIG. 4, track assemblies 30 each comprise continuous or "caterpillar" track systems, each having a continuous flexible band or loop of treads or track plates driven by two or more wheels; said substantially continuous and flexible loops each define a substantially upwardly facing upper surface 31. Sugarcane harvester 10 further has crop topper for 12 for removing unproductive leaves or other organic matter from the upper portion of a sugarcane crop. Crop divider 13, having augers 17, is used to cut sugarcane stalks at or near their bases.

A primary extractor assembly is used to separate leafy trash material (including, without limitation, stripped leaves, sprouts and other vegetation separated from cut sugarcane crop) from chopped billets or useable cane segments exiting the chopper of harvester 10. A fan distribution assembly 130 first outlet leg 133 and second outlet leg 134; in a preferred embodiment, said first outlet leg 133 and second outlet leg 134 are oriented at approximately a ninety (90) degree angle relative to each other. First duct member 110 having first end 111 (serving as an inlet to said first duct member 110) and a second end 112 (serving as an outlet to said first duct member 110) extends from first outlet leg 133 of fan distribution assembly 130 along a first lateral side of sugarcane harvester 10. Similarly, second duct member 120 having first end 121 (serving as an inlet to said second duct member 120) and a second end 122 (serving as an outlet to said second duct member 120) extends from second outlet leg 134 of fan distribution assembly 130 along a second lateral side of sugarcane harvester 10.

Separated trash materials from harvested crop exiting a chopper of harvester 10 are further chopped by a powered primary extractor fan, and are thereafter directed into an internal chamber defined by fan distribution assembly 130. A first ancillary fan is mounted within first outlet leg 133 of said fan distribution assembly 130, while a second ancillary fan is mounted within second outlet leg 134 of fan distribution assembly 130. Such separated trash materials directed into the internal chamber of fan distribution assembly 130 are further chopped by said first and second ancillary fans and thereafter directed into first duct 110 (through an inlet at first end 111) and second duct 120 (through an inlet at first end 121). In a preferred embodiment, said trash materials are substantially evenly divided between first outlet leg 133 and second outlet leg 134.

Said separated trash materials exiting first outlet leg 133 enter first duct 110, pass through said first duct 110, and exit said first duct 110 through an outlet at second end 112. In a preferred embodiment, containment diverter 113 can be mounted at second end 112 of first duct 110 to contain dispersal of trash material exiting said outlet at second end 112 of duct 110. Similarly, containment diverter 123 can be mounted at second end 122 of second duct 120 to contain dispersal of trash material exiting said outlet at second end 122 of second duct 120.

Trash materials discharged from outlets at the second ends 112 and 122 of said first and second ducts 110 and 120, respectively, are deposited onto the upper surfaces 31 of track assemblies 30. Such trash materials are then conveyed by said track assemblies 30 toward the front or forward portion of harvester 10, where said trash materials fall off of said track members generally in the path of said harvester 10. As the harvester 10 continues moving forward, harvester 10 runs over the deposited organic trash material deposited in its path; the weight of harvester 10, cooperating with the configuration of track assemblies 30, works to grind or abrade said trash material while simultaneously plowing said organic trash material into the underlying terrain.

Figures 5, 6, 7:
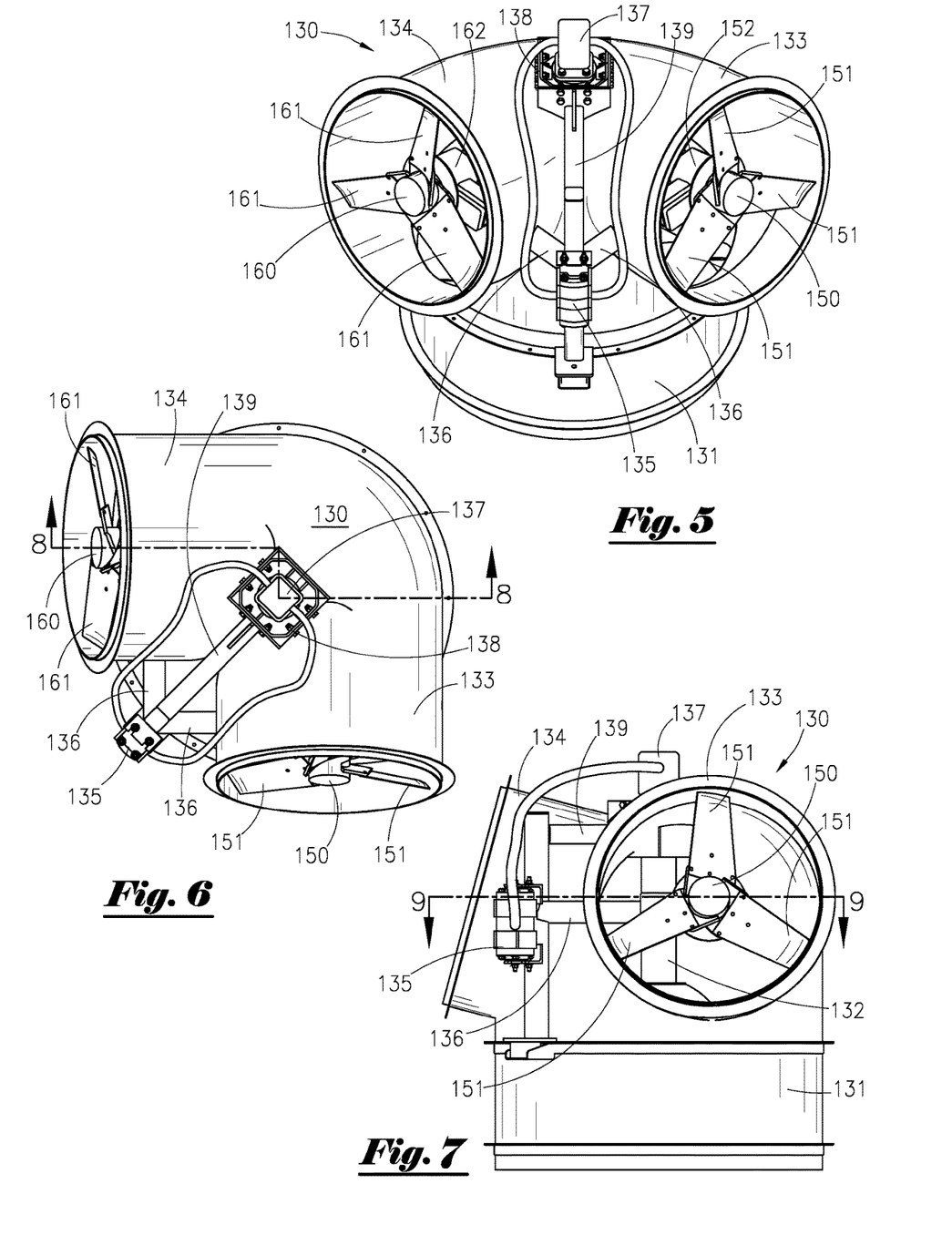
FIG. 5 depicts a front perspective view of the fan assembly of the present invention.
FIG. 6 depicts an overhead view of the fan assembly of the present invention.
FIG. 7 depicts a side view of the fan assembly of the present invention.

FIG. 5 depicts a front perspective view of fan distribution assembly 130 of the present invention, while FIG. 6 depicts an overhead view of fan distribution assembly 130 of the present invention. Said fan distribution assembly 130 further comprises first outlet leg 133 and second outlet leg 134 mounted on base 131. In a preferred embodiment, said first outlet leg 133 and second outlet leg 134 are oriented at an angle of approximately ninety (90) degrees relative to each other; however, it is to be observed that the angle formed between first outlet leg 133 and second outlet leg 134 can form an acute or obtuse angle without departing from the scope of the present invention. It is to be observed that base 131, as well as first outlet leg 133 and second outlet leg 134 cooperate to form an internal chamber. Further, said fan distribution assembly 130 can be mounted over the outlet of a chopper of a conventional combine harvester.

First ancillary fan 150 having a plurality of fan blades 151 is mounted within first outlet leg 133 of said fan distribution assembly 130. Said first ancillary fan 150 is powered by fan drive motor 162. Second ancillary fan 160 having a plurality of fan blades 161 is mounted within second outlet leg 134 of fan distribution assembly 130. Said second ancillary fan 160 is powered by fan drive motor 162. In a preferred embodiment, said first ancillary drive motor 152 and second ancillary drive motor 162 are hydraulically powered motors, and are supplied hydraulic fluid via hydraulic fluid hub 135 and conduits 136.

FIG. 7 depicts a side view of fan distribution assembly 130 of the present invention. A primary extractor fan (obscured from full view in FIG. 7) is rotatably disposed within said fan distribution assembly 130 on fan shaft 132 which, in turn, is rotatably mounted to said fan distribution assembly 130 using swivel mount 137. Hydraulic motor 138 is used to supply torque to fan shaft 132, and is supplied with hydraulic fluid from hydraulic fluid distribution hub 135 via hydraulic conduit 139.

Figure 8:
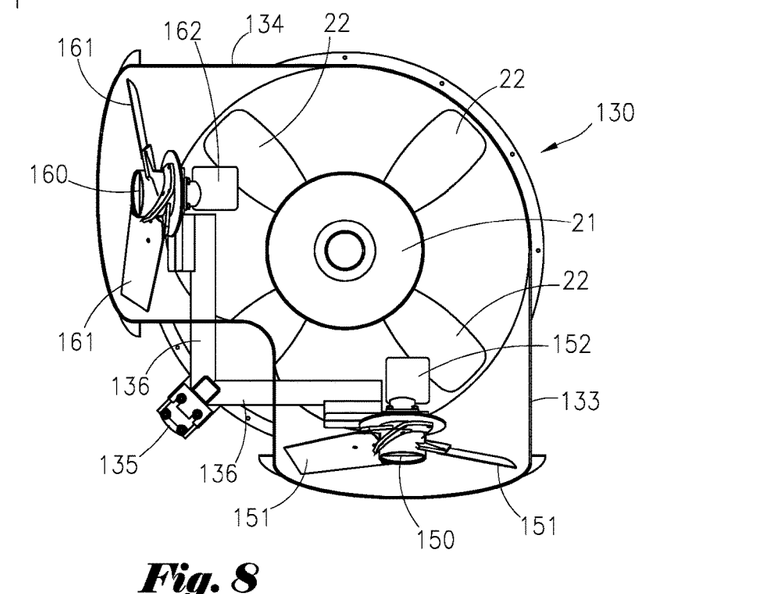
FIG. 8 depicts a sectional view of the fan assembly of the present invention along line 8-8 of FIG. 6.
Figure 9:
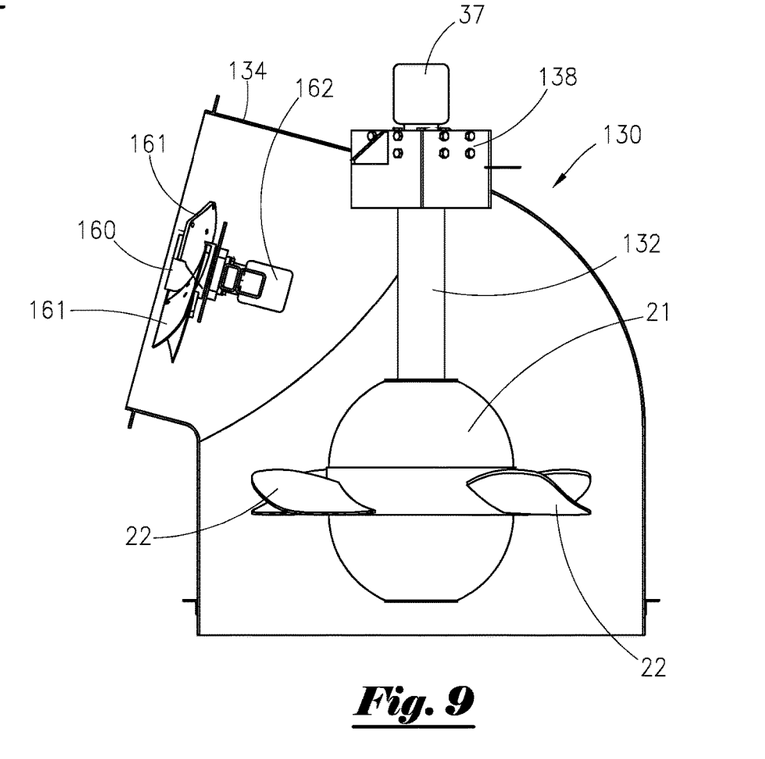
FIG. 9 depicts a sectional view of the fan assembly of the present invention along line 9-9 of FIG. 7.

FIG. 8 depicts a sectional view of fan distribution assembly 130 of the present invention along line 8-8 of FIG. 6, while FIG. 9 depicts a sectional view of fan distribution assembly 130 of the present invention along line 9-9 of FIG. 7. Said fan distribution assembly 130 comprises first outlet leg 133 and second outlet leg 134 mounted on base 131. Base 131, as well as first outlet leg 133 and second outlet leg 134, cooperate to form an internal chamber within fan distribution assembly 130.

Referring to FIG. 8, first ancillary fan 150 having a plurality of fan blades 151 is mounted within first outlet leg 133 of said fan distribution assembly 130; said first ancillary fan 150 is powered by fan drive motor 162. Second ancillary fan 160 having a plurality of fan blades 161 is mounted within second outlet leg 134 of fan distribution assembly 130; said second ancillary fan 160 is powered by fan drive motor 162. In a preferred embodiment, said first ancillary drive motor 152 and second ancillary drive motor 162 are hydraulically powered motors, and are supplied hydraulic fluid via hydraulic fluid conduits 136 extending from hydraulic fluid hub 135. Primary extractor fan 21 having a plurality of fan blades 22 is rotatably disposed within said fan distribution assembly 130 on fan shaft 132.

FIG. 9 depicts a side view of fan distribution assembly 130 of the present invention. Primary extractor fan 21 having a plurality of fan blades 22 is rotatably disposed within said fan distribution assembly 130 on fan shaft 132 which, in turn, is rotatably mounted to said fan distribution assembly 130 using rotatable swivel mount 137. Hydraulic motor 138, which is used to supply torque to fan shaft 132. Second ancillary fan 160 having a plurality of fan blades 161 is mounted within second outlet leg 134 of fan distribution assembly 130; said second ancillary fan 160 is powered by fan drive motor 162. Fan blades 22 rotate in a plane that is oriented substantially perpendicular to the central axis of shaft 132.

Referring to FIGS. 8 and 9, first ancillary fan 150 and second ancillary fan 160 have axes of rotation that are oriented parallel (or substantially or approximately parallel)

to each other. Further, said axes of rotation of said first ancillary fan 150 and second ancillary fan 160 are oriented perpendicular (or substantially or approximately perpendicular) to the axis of rotation of primary extractor fan 21.

Figure 10:
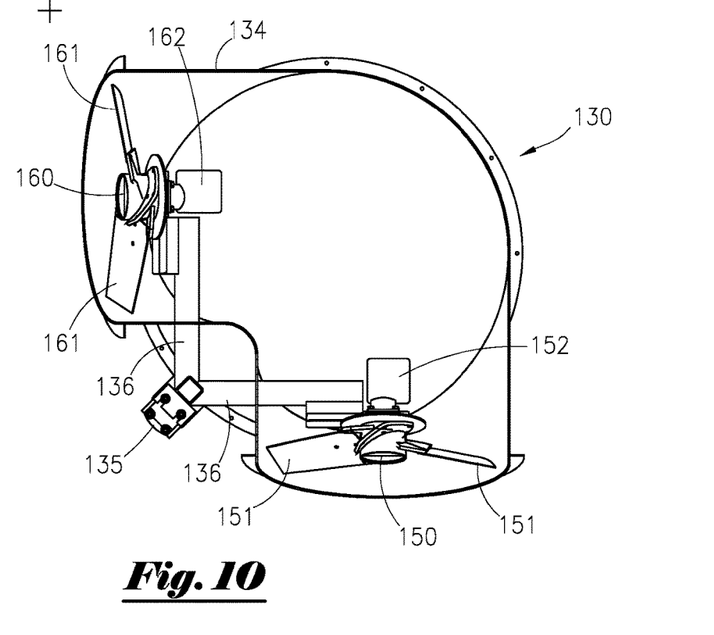
FIG. 10 depicts a sectional view of an alternative embodiment of the fan assembly of the present invention along line 8-8 of FIG. 6 wherein the primary extractor fan is removed.
Figure 11:
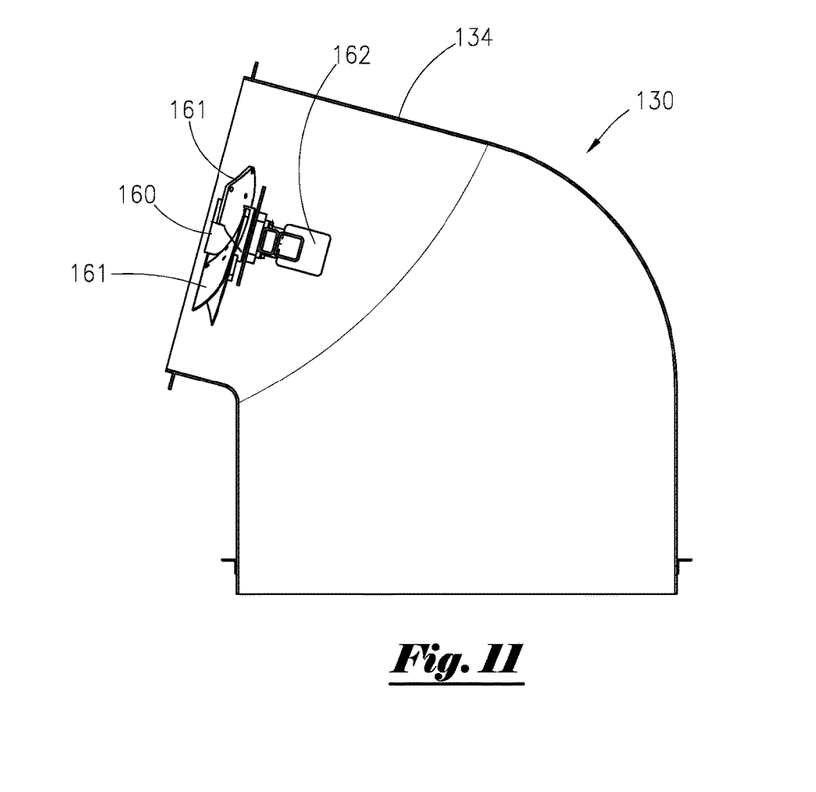
FIG. 11 depicts a sectional view of an alternative embodiment of the fan assembly of the present invention along line 9-9 of FIG. 7 wherein the primary extractor fan is removed.

FIG. 10 depicts a sectional view of an alternative embodiment of the fan assembly of the present invention along line 8-8 of FIG. 6 wherein the primary extractor fan is removed, while FIG. 11 depicts a sectional view of an alternative embodiment of the fan assembly of the present invention along line 9-9 of FIG. 7 wherein the primary extractor fan is removed.

Referring to FIG. 10, first ancillary fan 150 having a plurality of fan blades 151 is mounted within first outlet leg 133 of said fan distribution assembly 130; said first ancillary fan 150 is powered by fan drive motor 162. Second ancillary fan 160 having a plurality of fan blades 161 is mounted within second outlet leg 134 of fan distribution assembly 130; said second ancillary fan 160 is powered by fan drive motor 162. In a preferred embodiment, said first ancillary drive motor 152 and second ancillary drive motor 162 are hydraulically powered motors, and are supplied hydraulic fluid via hydraulic fluid conduits 136 extending from hydraulic fluid hub 135. Primary extractor fan 21 (depicted in FIG. 8, for example) is not present in the embodiment depicted in FIG. 10.

FIG. 11 depicts a side view of fan distribution assembly 130 of the present invention. Second ancillary fan 160 having a plurality of fan blades 161 is mounted within second outlet leg 134 of fan distribution assembly 130; said second ancillary fan 160 is powered by fan drive motor 162.

As noted above, conventional primary extractor assembly 20 discharges said separated trash materials 201 in a broad dispersal pattern over a large area with little or no control or direction over where said trash materials 201 eventually come to rest. Consequently, such conventional primary extractor assemblies frequently discharge such trash materials 201 in undesirable locations such as, for example, on adjacent property, on roadways, and/or in waterways. Such discharged organic trash materials 201 can come to rest on top of planted rows, can block sunlight from reaching the crops and can trap moisture, further hindering future agricultural crop productivity.

Referring to FIG. 4, in operation, a primary extractor assembly of harvester 10 is used to separate leafy trash material (including, without limitation, stripped leaves, sprouts and other vegetation separated from cut sugarcane crop) from chopped billets or useable cane segments exiting the chopper of harvester 10. A fan distribution assembly 130 has first outlet leg 133 and second outlet leg 134; in a preferred embodiment, said first outlet leg 133 and second outlet leg 134 are oriented at approximately a ninety (90) degree angle relative to each other. Further, said first outlet leg 133 and second outlet leg 134 can be tilted upward—that is, said first and second outlet legs may not be oriented directly parallel to underlying ground 210.

First duct member 110 having first end 111 (serving as an inlet to said first duct member 110) and a second end 112 (serving as an outlet to said first duct member 110) extends from first outlet leg 133 of fan distribution assembly 130 along a first lateral side of sugarcane harvester 10. Similarly, second duct member 120 having first end 121 (serving as an inlet to said second duct member 120) and a second end 122 (serving as an outlet to said second duct member 120) extends from second outlet leg 134 of fan distribution assembly 130 along a second lateral side of sugarcane harvester 10.

Separated trash materials from harvested crop exiting a chopper of harvester 10 are further chopped by a powered primary extractor fan (fan 21 depicted in FIGS. 8 and 9), and are thereafter directed into an internal chamber defined by fan distribution assembly 130. First ancillary fan 150 is mounted within first outlet leg 133 of said fan distribution assembly 130, while a second ancillary fan 160 is mounted within second outlet leg 134 of fan distribution assembly 130. In a preferred embodiment, said first ancillary fan 150 and second ancillary fan 160 rotate in opposing directions. For example, if ancillary fan 150 rotates in a clockwise direction, then second ancillary fan 160 can rotate in a counterclockwise direction.

Separated trash materials that are directed into the internal chamber of fan distribution assembly 130 are further chopped by said first and second ancillary fans and thereafter directed into first duct 110 (through an inlet at first end 111) and second duct 120 (through an inlet at first end 121). In a preferred embodiment, said trash materials are further chopped into smaller pieces by first ancillary fan 150 and second ancillary fan 160 and, further, substantially evenly divided by first ancillary fan 150 and second ancillary fan 160 between first outlet leg 133 and second outlet leg 134.

Said separated trash materials exiting first outlet leg 133 enter first duct 110, pass through said first duct 110, and exit said first duct 110 through an outlet at second end 112. In a preferred embodiment, optional containment diverter 113 is mounted at second end 112 of first duct 110 to contain dispersal of trash material exiting said outlet at second end 112 of duct 110. Similarly, optional containment diverter 123 is mounted at second end 122 of second duct 120 to contain dispersal of trash material exiting said outlet at second end 122 of second duct 120.

Trash materials discharged from outlets at the second ends 112 and 122 of said first and second ducts 110 and 120, respectively, are deposited onto the upper surfaces 31 of track assemblies 30. Such trash materials are then conveyed by said track assemblies 30 toward the front or forward portion of harvester 10, where said trash materials fall off of said track members generally in the path of said harvester 10. As the harvester 10 continues moving forward, harvester 10 runs over the deposited organic trash material deposited in its path; the weight of harvester 10, cooperating with the configuration of track assemblies 30, works to grind or abrade said trash material while simultaneously plowing said organic trash material into the underlying terrain.

Such deposited trash material also helps to level operation of combine harvester 10, which can have a tendency to tilt (frequently due to the weight of elevator 15). Additionally, because harvester 10 rides on a layer of deposited trash material, much less mud adheres to the tracks of harvester 10. As a result, significantly less mud (which frequently includes valuable and fertile top soil) is redistributed in other areas of a planted field or, in extreme cases, removed entirely from said field.

In this manner, the trash material is substantially confined or limited to the furrows in the terrain created by the track assemblies 30 of harvester 10. Further, such plowed organic trash material (which has been chopped into small pieces) degrades and decomposes at a much faster rate than trash material that is deposited in a blanket-like layer. Such degraded/decomposed trash material can provide nutrients to the underlying soil, thereby beneficially impacting future agricultural crops.

Thus, the present invention facilitates efficient and cost effective handling and disposal of trash vegetation material generated during the harvesting process, eliminating the need for burning of such trash material or supplemental/secondary operations required to collect, transport and/or dispose of the trash material. The present invention is also better for the environment; it reduces fuel consumption of harvester 10, while eliminating the need for post-harvest burning operations.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for handling and disposing of organic waste material generated by a sugarcane harvester having an extractor comprising:
    a) a distribution assembly configured to receive organic material from said extractor, wherein said distribution assembly further comprises at least one inlet, an internal chamber, and at least one outlet;
    b) at least one fan disposed within said distribution assembly and configured to expel said organic waste material from said outlet of said distribution assembly; and
    c) at least one duct member having an inlet, an outlet and a length, wherein said inlet is operationally attached to said at least one outlet of said distribution assembly, and wherein said outlet is configured to deposit said organic waste material on the upper surface of a track of said sugarcane harvester.

2. The apparatus of claim 1, wherein said track is configured to redeposit said organic waste material in the path of said sugarcane harvester.

3. The apparatus of claim 2, wherein said sugarcane harvester is configured to traverse over said redeposited organic waste material.

4. The apparatus of claim 1, wherein said at least one fan further comprises:
    a) a first fan configured to rotate in a clockwise direction; and
    b) a second fan configured to rotate in a counterclockwise direction.

5. An apparatus for handling and disposing of organic waste material generated by a sugarcane harvester equipped with an extractor having an extractor fan comprising:
    a) a distribution assembly configured to receive organic material from said extractor, wherein said distribution assembly further comprises at least one inlet, an internal chamber, and first and second outlets;
    b) a first distribution fan disposed within said first outlet of said distribution assembly, wherein said first distribution fan is configured to expel a first portion of said organic waste material from said first outlet of said distribution assembly;
    c) a second distribution fan disposed within said second outlet of said distribution assembly, wherein said second distribution fan is configured to expel a second portion of said organic waste material from said second outlet of said distribution assembly;
    d) a first duct member having an inlet, an outlet and a length, wherein said inlet of said first duct member is operationally attached to said first outlet of said distribution assembly, and wherein said outlet of said first duct member is configured to deposit said first portion of said organic waste material on an upper surface of a first track of said sugarcane harvester; and
    e) a second duct member having an inlet, an outlet and a length, wherein said inlet of said second duct member is operationally attached to said second outlet of said distribution assembly, and wherein said outlet of said second duct member is configured to deposit said second portion of said organic waste material on an upper surface of a second track of said sugarcane harvester.

6. The apparatus of claim 5, wherein said organic waste material deposited on said first and second tracks of said sugarcane harvester is redeposited in the path of said sugarcane harvester.

7. The apparatus of claim 6, wherein said sugarcane harvester is configured to traverse over said redeposited organic waste material.

8. The apparatus of claim 5, wherein said first distribution fan is configured to rotate in a clockwise direction and said second distribution fan is configured to rotate in a counterclockwise direction.

9. The apparatus of claim 5 wherein said first duct member is disposed along a first side of said sugarcane harvester and said second duct member is disposed along a second side of said sugarcane harvester.

10. The apparatus of claim 5, wherein the axes of rotation of said first and second distribution fans are approximately parallel to each other.

11. The apparatus of claim 5, wherein said first and second distribution fans are configured to further chop organic waste material in said distribution assembly.

12. A method for handling and disposing of organic waste material generated by a sugarcane harvester having an extractor comprising:
    a) providing a waste handing apparatus on said sugarcane harvester, said waste handling apparatus further comprising:
        i) a distribution assembly configured to receive organic material from said extractor, wherein said distribution assembly further comprises at least one inlet, an internal chamber, and at least one outlet;
        ii) at least one fan disposed within said distribution assembly;
        iii) at least one duct member having an inlet, an outlet and a length, wherein said inlet is operationally attached to said at least one outlet of said distribution assembly;
    b) delivering organic waste material from said extractor of said sugarcane harvester to said internal chamber of said distribution assembly;
    c) chopping said organic waste material using said at least one fan disposed within said distribution assembly;
    d) delivering said chopped organic waste material into said at least one duct member; and
    e) depositing said chopped organic waste material on an upper surface of a track of said sugarcane harvester.

13. The method of claim 12, further comprising redepositing said organic waste material in the path of said sugarcane harvester.

14. The method of claim 13, further comprising at least partially plowing said organic waste material into underlying soil using the tracks of said harvester.

* * * * *